March 3, 1959  F. F. KISHLINE ET AL  2,876,018
VEHICLE WHEEL SUSPENSION
Filed Aug. 12, 1955  3 Sheets-Sheet 2
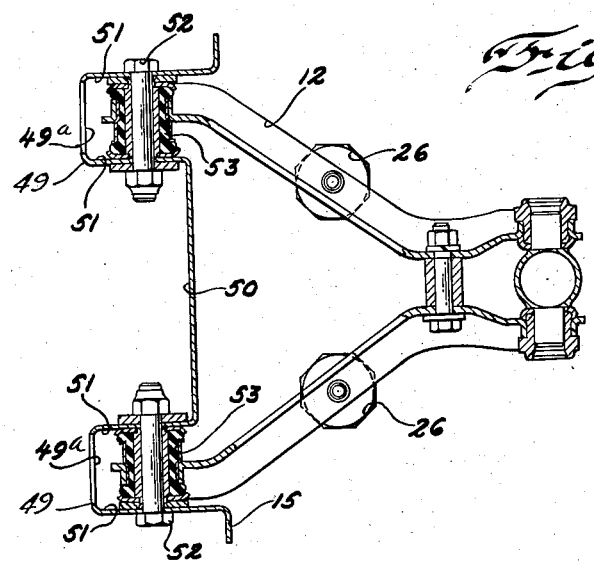
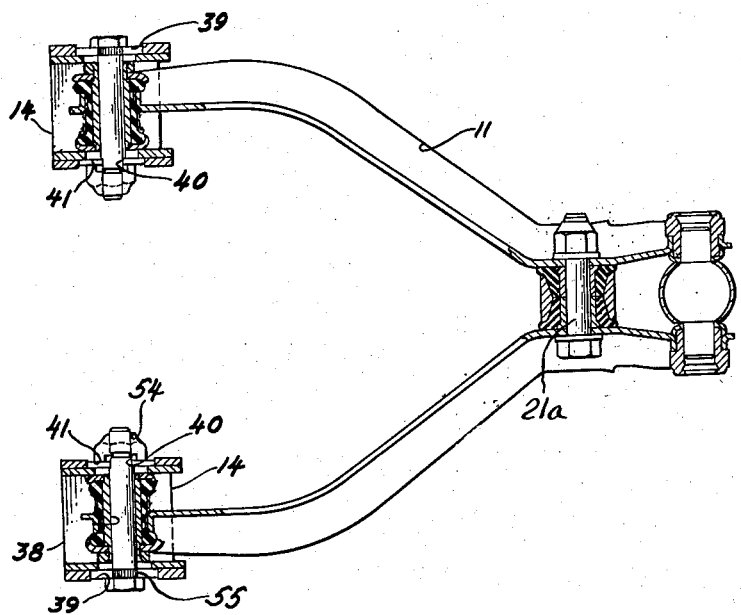
INVENTOR.
FLOYD F. KISHLINE
JOHNSTON S. VOIGHT
BY
Carl J. Barbee

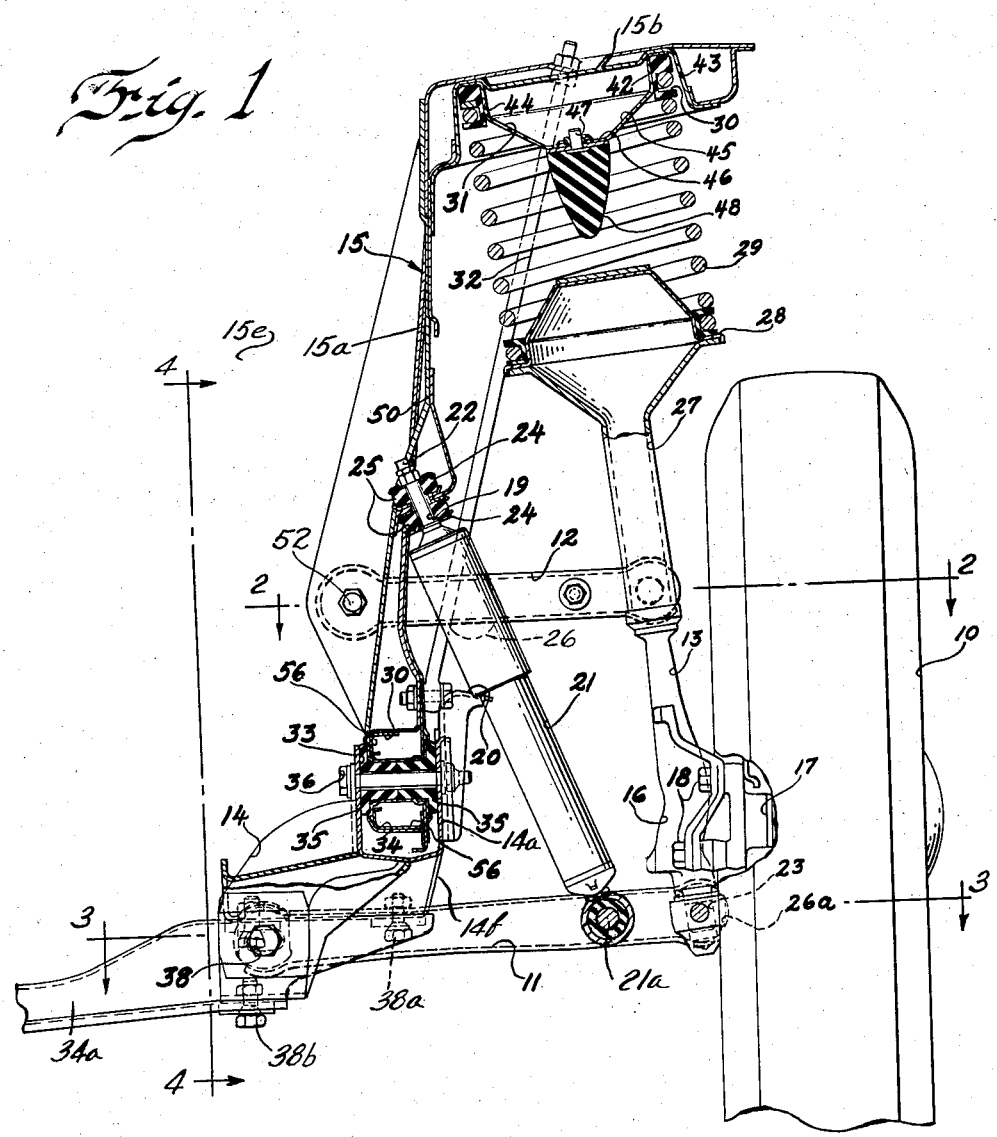

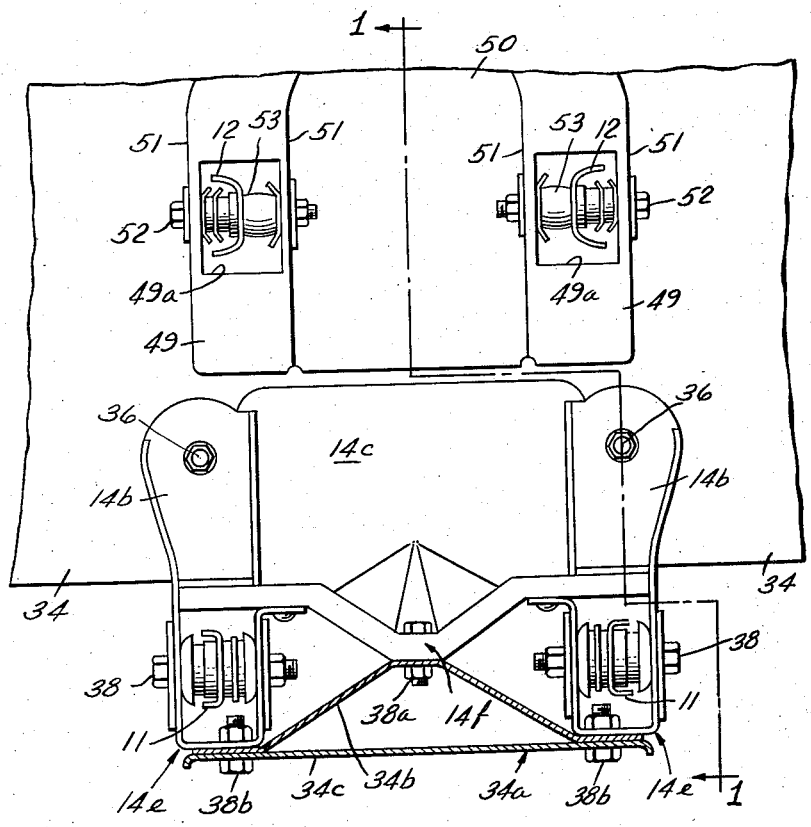

United States Patent Office 2,876,018
Patented Mar. 3, 1959

2,876,018

VEHICLE WHEEL SUSPENSION

Floyd F. Kishline and Johnston Stuart Voigt, Kenosha, Wis., assignors to American Motors Corporation, Kenosha, Wis., a corporation of Maryland Application August 12, 1955, Serial No. 528,088

4 Claims. (Cl. 280—106.5)

This invention relates generally to motor vehicles and it has particular relation to an individual wheel suspension arrangement for wheels of said vehicle.

It is an object of this invention to provide an independent wheel suspension for a vehicle which is simple and encomical to manufacture.

It is another object of this invention to provide an independent wheel suspension for a vehicle which will be completely assembled and adjusted before it is secured to the body of the vehicle.

It is another object of this invention to provide an independent wheel suspension for a vehicle in which many of the parts are integral units, thus reducing the total number of parts in the complete assembly.

It is a further object of this invention to provide an independent wheel suspension for a vehicle which will provide a smoother ride to the occupants of the vehicle and also easier steering of said vehicle.

Further objects and advantages of the invention will appear hereinafter as the description proceeds and will be pointed out more fully in connection with the appended claims.

In the drawings, of which there are two sheets and in which the same numbers are used to indicate like numbers:

Fig. 1 is a sectional view of the invention as applied to one of the front wheels of an automobile, such sectional view being taken generally on the irregular line 1—1 of Figure 4.

Figure 2 is a sectional view of the upper control arm taken generally on the line 2—2 of Figure 1.

Figure 3 is a sectional view of the lower control arm taken generally on the line 3—3 of Figure 1, and Figure 4 is a fragmentary side elevational view taken on the line 4—4 of Figure 1.

The vehicle body, with which the invention of the instant application is associated, is made up generally of sheet metal members which are secured to a frame portion or sill providing a "unitized" body and frame structure. At the forward end of the body is formed in the manner of a a portion of the body is formed in the manner of a wheel housing which housing is ultimately completely covered by a hood and the front fender, said wheel housing substantially embracing one of the front wheels 10.

The control arms 11 and 12 are of well known construction with one end of arm 11 connected to king pin 13 and the other end connected to the lower part of bracket 14. The other control arm 12, which is the upper arm, is also connected at its ends to said king pin 13 and to the wheel housing 15 remote from the connecting points of control arm 11. The king pin 13 is connected to wheel 10 by assembly 16. This assembly comprises the wheel spindles 17 on which wheels 10, one only of each wheel and spindle shown here, are mounted and have portions extending through apertures in pins 13 and nuts 18 are threaded on said portions to rigidly secure the spindle 17 to pins 13. To upper control arms 12 are secured rubber bumpers 26 which strike members 20 when wheels 10 are lowered excessively.

A shock absorber 21 is pivotally mounted at its lower end on pin 21a to control arm 11. The upper end of the shock absorber may have a stem portion 22 which protrudes through an enlarged opening provided in the wheel housing. Cup washer-like plates 24 are spaced on said stem and above and below the enlarged opening to receive rubber washers 25 arranged between a pair of said plates. More specifically, the stem passes through said washers and is secured to the boss portion 25a which is anchored to the wheel housing 15. The rubber washers provide a cushion between said stem 22 and the wheel housing to eliminate undue body noises.

Pin 13 is provided with a reduced portion 23 formed near its lower end. Around reduced portion 23 is positioned a trunnion member 26a. This reduced portion 23 is secured at its lower end in any suitable manner to said lower control arm 11.

A tower 27 projects upwardly from pin 13 and is provided with a spring seat 28 in which one end of a compression spring 29 is secured, said spring extending upwardly and secured at its free end in a second spring seat 30 formed in the cone-shaped stamping 31 forming an integral part of said wheel housing 15.

A pair of brace rods 32 (only one being shown in Figure 1) are spaced on each side of said shock absorber having their upper ends secured in said stamping 31 and their lower ends secured in the lower part of said wheel housing 15 adjacent the sill.

Referring to Figures 1 and 4, it will be noted that the bracket 14 is made up of several stampings welded or bolted together to form a unitary structural member which is assembled as a unit between the sill 34 and the cross brace 34a. The bracket 14 includes a U-shaped portion made up of the end stampings 14b secured at either end to the central panel 14c. On the opposite side of the sill the U-shaped portion of bracket 14 includes the side wall 14d (see Figure 1). The bracket 20 is anchored to the end wall 14d and serves as a stop against which the resilient bumper 26 strikes, as has been previously explained.

The U-shaped portion of the bracket 14 receives the sill 34 and is bolted thereto at spaced intervals (as shown in Figure 4) by means of bolts 36. Rubber grommets 35 (one set of which is shown in Figure 1) surround the bolts 36 to insulate the bracket 14 from the wheel housing 15. The bracket 14 includes downwardly depending channel-shaped leg portions defining pockets 14e into which the inner ends of the control arms 11 are pivotally received on bolts 38. The bracket 14 has a downwardly depending portion 14f situated centrally between the leg portions 14e and the cross brace 34a is bolted thereto as by means of the bolt 38a. The cross brace 34a may be made up of two stampings 34b and 34c and in addition to being bolted to bracket 14 at the bolt 38a is also secured to each of the leg portions of said bracket 14 by means of the bolts 38b. The cross brace 34a, of course, extends across the width of the vehicle between the one bracket 14 on one side of the vehicle and a similar bracket which would be situated on the opposite side of the vehicle (the construction details at only one side of the vehicle being shown).

Caster and camber adjustments of the wheel relative to the wheel body (which adjustments are common in the art) are effected by loosening of the nuts 54 and turning the bolt 38. The bolt 38 is serrated adjacent the head of the bolt as indicated at 55 and engages a cam member 39 mounted on said bolt 38. Said bolt has opposed flat portions 40 at its other end that engages a cam member 41 also mounted on said bolt. The caster and camber adjustments are effected by actuation of said cams 39, 41 by said serrated portion 55 and said flats 40, respectively.

The wheel housing 15 includes the enlarged circular stamping plate 31 having a substantial part of its edge 42 folded over and secured at various points to the top section 43 of said wheel housing. This plate is of substantial depth having initially a steep wall 44 and then a gradually sloping wall 45 terminating in a flat bottom 46. This flat bottom is upset in the center and contains an opening through which a pin 47 for holding bumper 48 projects.

The body portion of the wheel housing includes the primary panel member 15a which has the outwardly extending shelf portion 15b welded to the upper end thereof. The primary panel member lies in a substantially vertical position and may be said to separate the engine compartment (indicated by the numeral 15c) from the ground wheel 10 and a bracket of substantial size is welded to the primary panel member. The bracket is comprised of spaced channel portions 49 which are interconnected by means of the web portion 50.

Each channel 49 is arranged to provide spaced walls 51 to provide space for an end for each control arm 12. Each end is disposed between said walls 51 and held therein by suitable fastening elements 52. Proper rubber grommet members 53 are disposed between the ends of said arm 12 and the walls 51 to provide insulation against noise. Each channel 49 is substantially U-shaped throughout the major part of its length but the walls do converge toward each other at its top point, see Figure 1. The end walls of the channel members may be provided with openings 49a permitting access to the ends of the control arms 12.

The lower end of each channel 49 is reenforced by blocks 56 which make up the sill 34.

It is believed that the construction, manipulation, utility and advantages of this invention will now be clearly apparent to those skilled in this art without a more detailed description thereof.

The possible embodiment of the invention has been described in considerable detail merely for the purposes of exemplification since in actual practice it attains the features of the invention and the above description.

It will be apparent that changes in the details of construction and in the combinations and arrangements of parts may be resorted to without departing from the spirit or scope of the invention as hereinafter claimed or sacrificing any of its advantages.

What is claimed is:

1. In a ground wheel suspension system for an automotive vehicle having an engine compartment, a supporting structure comprising: a primary panel separating the ground wheel from the engine compartment; a bracket formed of sheet material and including a base portion and channel portions integral with and formed along the opposite side margins of the base portion, said bracket being secured to the primary panel; an upper control arm having spaced branches, one each of which is received with a respective channel portion of the bracket and connected for swinging movement relative thereto; a sill extending generally longitudinally of the vehicle anchored at the lower ends of the bracket and primary panel; a second bracket disposed beneath the first bracket and having at its upper end spaced walls between which the sill member is received and secured thereto; said second bracket having spaced downwardly depending pockets situated at a level beneath that of the sill member; a brace extending transversely relative to the sill member and having its opposite side margins anchored respectively to the underside of the downwardly depending pockets and a lower control arm having spaced branches, one each of which is pivotally anchored within a respective pocket.

2. A supporting structure for an automotive suspension system as set forth in claim 1 wherein a resilient bushing is interposed between the side walls of the second bracket and the sill to insulate the second bracket from the sill and first bracket.

3. In a ground wheel suspension system for an automotive vehicle having an engine compartment and a ground wheel, a supporting structure comprising: a primary panel separating the ground wheel from the engine compartment; a bracket formed of sheet material and including a base portion and channel portions integral with and formed along the opposite side margins of the base portion, said bracket being secured to the primary panel; an upper control arm having spaced branches, one each of which is received within a respective channel portion of the bracket and connected for swinging movement relative thereto; a sill member anchored at the lower end of the bracket and extending generally lengthwise of the vehicle; a second bracket disposed beneath the first bracket and including at its upper end spaced walls between which the sill member is received and secured thereto, said second bracket also including downwardly depending spaced pockets; a lower control arm having spaced branches, one each of which is pivotally received within a respective pocket and a brace extending transversely of the vehicle and being anchored to each of the pockets.

4. A ground wheel suspension system as set forth in claim 3 wherein the second bracket includes a downwardly depending tongue portion situated between the bracket pockets and the brace is secured to such tongue portion.

References Cited in the file of this patent

UNITED STATES PATENTS

| | | |
|---|---|---|
| 2,018,653 | Best | Oct. 29, 1935 |
| 2,611,625 | Kishline et al. | Sept. 23, 1952 |
| 2,718,409 | Kishline et al. | Sept. 20, 1955 |